J. P. Gallagher's
Improvement in Cocks & Faucets.

4140

REISSUED OCT 4 1870

Witnesses.
A. E. Fillmore
J. H. Mester

Inventor.
J. P. Gallagher
by Geo. Rothwell
atty.

THE ECKERT LITHOGRAPHING CO., WASHINGTON, D. C.

United States Patent Office.

JOSEPH P. GALLAGHER, OF ST. LOUIS, MISSOURI.

Letters Patent No. 48,673, dated July 11, 1865; reissue No. 4,140, dated October 4, 1870.

IMPROVEMENT IN COCKS.

The Schedule referred to in these Letters Patent and making part of the same.

*To all whom it may concern:*

Be it known that I, JOSEPH P. GALLAGHER, of St. Louis, in the county of St. Louis and State of Missouri, have made a certain new and useful Improvement in Cocks, Faucets, and Valves, for which Letters Patent of the United States were issued to me, bearing date the 11th day of July, 1865, and numbered 48,673, which said Letters Patent are believed to be insufficient and defective, by reason of an incomplete and deficient specification; now, therefore, I do hereby declare the following amended specification to be a full and true description of my said invention, and of the construction of the said improvements, and of the use and application thereof.

In stop-cocks, faucets, and valves, such as are used for hydrants, water and other pipes, a valve is made to close or open the water or fluid-passage to the discharge-pipe, and said valve is usually operated by a stem from without; then, in order to prevent leakage at the point where the stem passes out through the chamber of barrel of the cock or faucet, a stuffing-box or other packing arrangement is employed. Owing to the great wear at said joint, there is here frequent leakage.

Again, as especially in water-pipes which are exposed, there is danger of freezing, if the water remains therein, it is necessary to form an escape for the waste water remaining in the pipe above the stop-cock, as, for instance, of ordinary hydrants.

For this purpose, and to avoid the necessity of the packing at the stem-joint with the barrel of the cock or faucet, as before explained, and generally to form an improved stop-cock, faucet, or valve, The nature of this invention is—

First, in the arrangement of a movable valve between two seats, one of which acts with the valve to shut off water in the usual way, the other, however, being so arranged that, when the valve leaves the former seat, it shall (the valve being fairly raised) rest against the said second seat, thus preventing leakage out above the valve and at the stem-joint; and, Secondly, the nature of this invention is in the arrangement of the parts for discharging the waste-water from the outlet-pipe, when the water flow is checked, so as to prevent freezing, as before indicated.

To enable those herein skilled to make and use my said improvements, I will now more fully describe the same, referring to—

Figure 1:
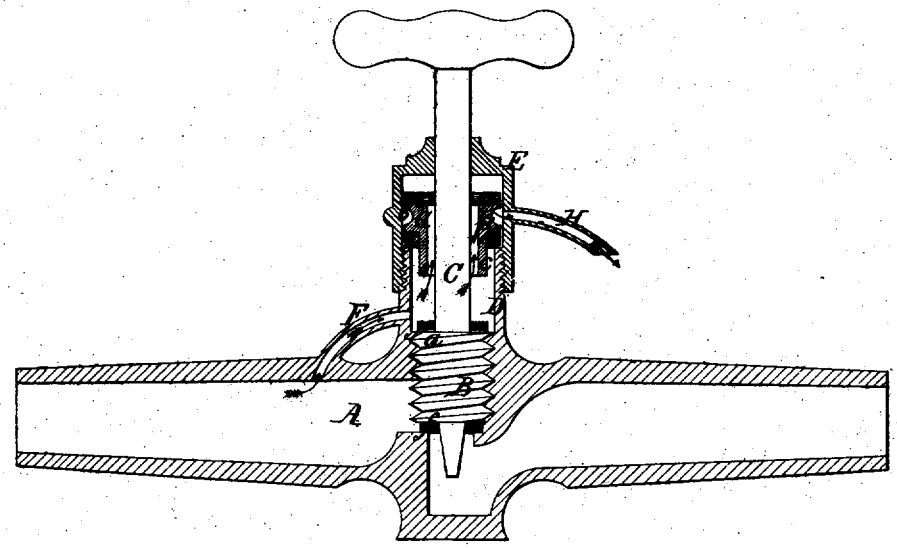
Figure 2:
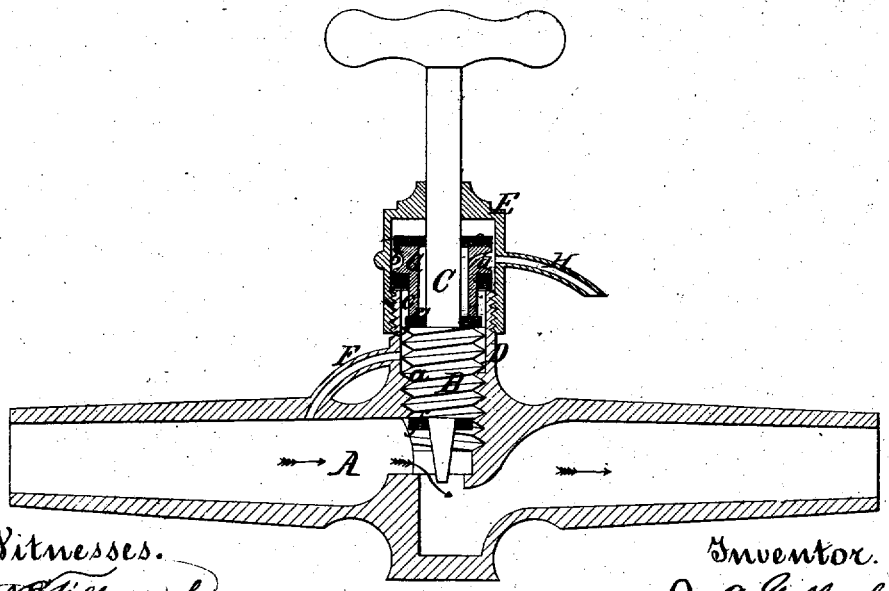

Figure 1 as a sectional elevation showing the valve closed to check the water or fluid-flow to the outlet; and to Figure 2 as a sectional elevation, showing the valve raised to its upper seat.

Both figures show the application of the features of this invention to an ordinary stop-cock or water-faucet.

As represented—

A is the body of the cock.

B, the valve, which, in the first figure, is on the lower seat, so as to cut off the water from the outlet; and in the second figure is raised to permit the flow.

The valve B is raised by means of the screw-threads *a* and the valve-stem C, the screw-threads engaging in the chamber or barrel D, (as in a nut,) so that the stem C, when operated to turn the valve B, will also raise the same.

The barrel D is connected directly with the bore of the pipe A, and the said barrel is closed at the upper end, to fit about the out-going stem C by the screw-cap E, generally as indicated in the figures.

F represents the waste-tube for permitting the water in the outlet-pipe to pass off when the water is shut off, as in fig. 1, the return being made then above the valve B to a waste-pipe, as hereafter to be more fully explained.

Said tube or pipe F may be cored as a part of the body-casting A of the cock, or may be fitted in as a separate pipe, so as to join water-tightly with the other parts.

The lower seat of the valve B is formed in the valve-body A, generally as usual. The upper seat is formed as follows, to wit:

Within the cap E is arranged a circular disk, G; this has a groove, *b*, cut in its periphery, which communicates by a passage, *d*, with the inner surface or chamber, within the bore of said disk G.

From said disk there is pendent the annular collar *c*, the lower surface whereof forms the valve-seat for the valve B, as above required.

To give the needed tightness of joint, a packing-strip, (usually leather or rubber,) *f* and *f'*, is placed upon each end of the valve.

Similarly, in order that the joints of the disk G with the chamber D may be secure, a packing-strip, *e*, will be placed under said disk, and to prevent abrasion of the disk upper surface, and also to make a better joint, a leather washer will also be placed to cover the said disk, and thus intervene between the cap E and the same.

Arranged suitably in line with the annular groove *b* of the disk G, is the waste-pipe H, so that the interior hereof is thus in communication with the annular chamber within the disk G and its flange *c*, and when the valve B is in the position indicated in fig. 1, said parts will be in communication with the tube or passage F and the outlet-end of the cock A, so that thus a discharge of the water standing above the valve B may take place, the discharge-end of the waste H being lower than said other parts; and thus, when this arrangement is applied to hydrants, or when the outlet-pipes are exposed to frost, damage will be avoided.

It is plain that when, as shown in fig. 1, the waste-pipes F and H are in action, there being a comparatively small pressure to the waste-column of fluid, a discharge thereof is effected, without wastage at the stem-joint with the cap E, even without packing devices, but that, under all contingences, there is no great wear or damage to the packing-washers under the cap E, and that, therefore, leakages are here fairly avoided.

Again, when the pressure of the flowing water is exerted upon the opened valve B, as shown in fig. 2, the valve being against its upper rest or seat, a water-tight joint is thus made, and there can be no leakage at the stem of the valve.

The operation of shutting off the fluid flow is here made by lowering the valve B, that is, moving the same downwardly against the pressure of the fluid, thus avoiding water-hammer, or other jar or concussion attendant upon a sudden closing of valve.

The screw *a* will be made with a quick turn or pitch, so as to raise the valve readily to meet its upper seat, but instead of operating the valve by screw and nut and stem, a cam or other movement may be used advantageously, it being merely desirable that, in all cases, the valve should move rapidly from one seat to the other, and that it may be seated firmly when down or up, to make tight-fitting joints.

Having thus fully described my said invention,

What I claim is—

1. The valve B, with two faces *f* and *f'*, and arranged to move between and operate in connection with two seats, substantially as set forth.

2. The disk G, with a flange, *c*, and groove *b*, and having a seat-surface, to make a water-tight joint with the valve B *f'*, substantially as set forth.

3. The tube F, arranged relatively to the body A of the cock or faucet, and the chamber or barrel D and the valve B, in connection with the flange *c*, disk G, and escape-spout H, substantially as and for the purpose described.

4. The groove *b*, in the periphery of the disk G, when used in connection with the parts specified in the third claim, substantially as and for the purpose set forth.

In testimony whereof, I have hereunto set my hand in presence of—

JOSEPH P. GALLAGHER.

Witnesses:

GEO. P. HERTHEL, JR.

WILLIAM W. HERTHEL.